Nov. 26, 1929.  L. P. LEWIS  1,736,927
MUZZLE RING FOR HOGS
Original Filed Dec. 4, 1926
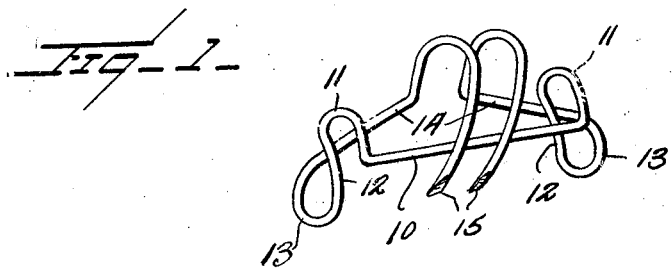
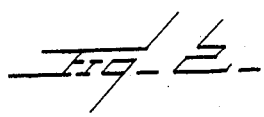
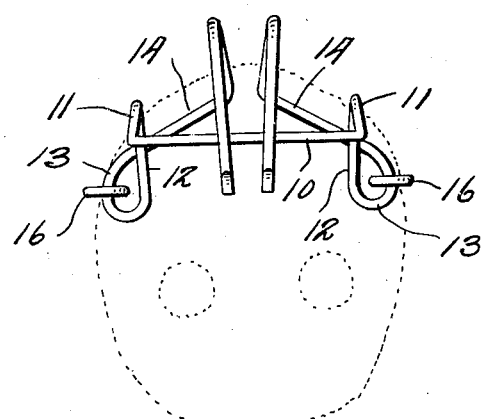
Inventor
L. P. Lewis
By Watson E. Coleman
Attorney Patented Nov. 26, 1929

1,736,927

UNITED STATES PATENT OFFICE

LEE P. LEWIS, OF HALLSVILLE, MISSOURI

MUZZLE RING FOR HOGS

Application filed December 4, 1926, Serial No. 152,619. Renewed April 12, 1929.

This invention relates to hog rings and the general object of the invention is to provide a muzzle ring for use on a hog's nose which will keep it from rooting, prevents it lifting a wire fence and going under the same, and also from rooting open gates.

A further object is to provide a device of this character which will not be fastened in the gristle or cartilage of the hog's nose and which will, therefore, not cause the snout of the animal to swell or be sore as do all of the hog rings known to me, and which will not affect eating or drinking in any way.

My invention is illustrated in the accompanying drawings wherein:—

Figure 1 is a perspective view of my improved hog ring;

Fig. 2 is a front elevation thereof in applied position on a hog's snout;

Fig. 3 is an end elevation thereof showing the hog's snout in dotted lines.

Referring to these drawings it will be seen that the hog ring is formed of a single length of wire so bent as to provide a cross bar 10, which at its ends is upwardly and rearwardly bent, as at 11. The wire then extends forward from each of these portions 11, as at 12, and is bent to form an eye 13. From each eye the wire is extended upward and rearward, as at 14, then upward and forward and then downward in a curve to form the prong 15. Inasmuch as one end of the wire is bent or formed precisely like the other end of the wire, it will be seen that two prongs 15 are provided which are extended from the laterally divergent portions 14 terminating in the eyes 13, these eyes forming the rear ends of the portions 11 projecting from the cross bar 10. This construction forms a muzzle within which a portion of a hog's snout is encaged.

Rings 16 are passed through the rim 17 of the hog's snout and the eyes 13 are engaged with these rings. In practice, this muzzle is adjusted upon the hog's snout, as shown in Figure 3, so that the cross bar 10 extends across the end of the hog's snout above the nostrils and the curved prongs 15 are supported so that they extend downward in advance of the snout, the cross bar preventing the prongs from projecting into the nose of the animal unless the animal attempts to root. The action of rooting involves an upward movement of the hog's snout and this will cause the prongs to be forced into the nose, thus pricking the animal at a very sensitive point and thus the animal is prevented from rooting or lifting up with his nose. Thus the animal cannot lift up on a wire fence or root open a gate. At the same time it does not prevent in any way the animal from eating or drinking. I design that the device shall be made in three or more sizes for different sizes of hogs.

It is to be particularly noted that the rings 17 are not past through the cartilage of the hog's snout but past through the rim of the nostrils above the nostrils on each side of the cartilage.

I claim:—

1. A hog ring of the character described comprising a transverse bar formed with eyes at its extremities and then formed with an upwardly and rearwardly extending portion extending from each eye, the ends of said portions being forwardly, downwardly and inwardly bent to form curved prongs.

2. A hog ring of the character described comprising a transversely extending straight bar, the bar at its ends being angularly bent, the material being then formed to provide eyes at opposite ends of the bar rearward thereof, and disposed in a plane at right angles to the plant of the bar, the material then being extended upwardly and convergently and then bent to form two forwardly, downwardly and rearwardly curved prongs, the extremities of which are disposed adjacent the bar.

3. A hog ring device of the character described comprising a transversely extending straight bar, the bar at its ends being angularly bent to form eyes, the material being then formed to extend upwardly and rearwardly, the ends of said upwardly and rearwardly extending portions being forwardly, downwardly, and inwardly bent to form curved prongs, and rings engaged with said eyes and adapted to be past through the rim of a hog's nose.

In testimony whereof I hereunto affix my signature.

LEE P. LEWIS.